Sept. 20, 1960 A. FROHLICH 2,953,186
PNEUMATIC TIRE BUILDING APPARATUS
Filed May 2, 1955 5 Sheets-Sheet 1

INVENTOR.
ADOLF FRÖHLICH
BY
L. William Freeman
ATTORNEY

Sept. 20, 1960 A. FROHLICH 2,953,186
PNEUMATIC TIRE BUILDING APPARATUS
Filed May 2, 1955 5 Sheets-Sheet 4

FIG. 4

INVENTOR.
ADOLF FRÖHLICH
BY L. William Freeman
ATTORNEY

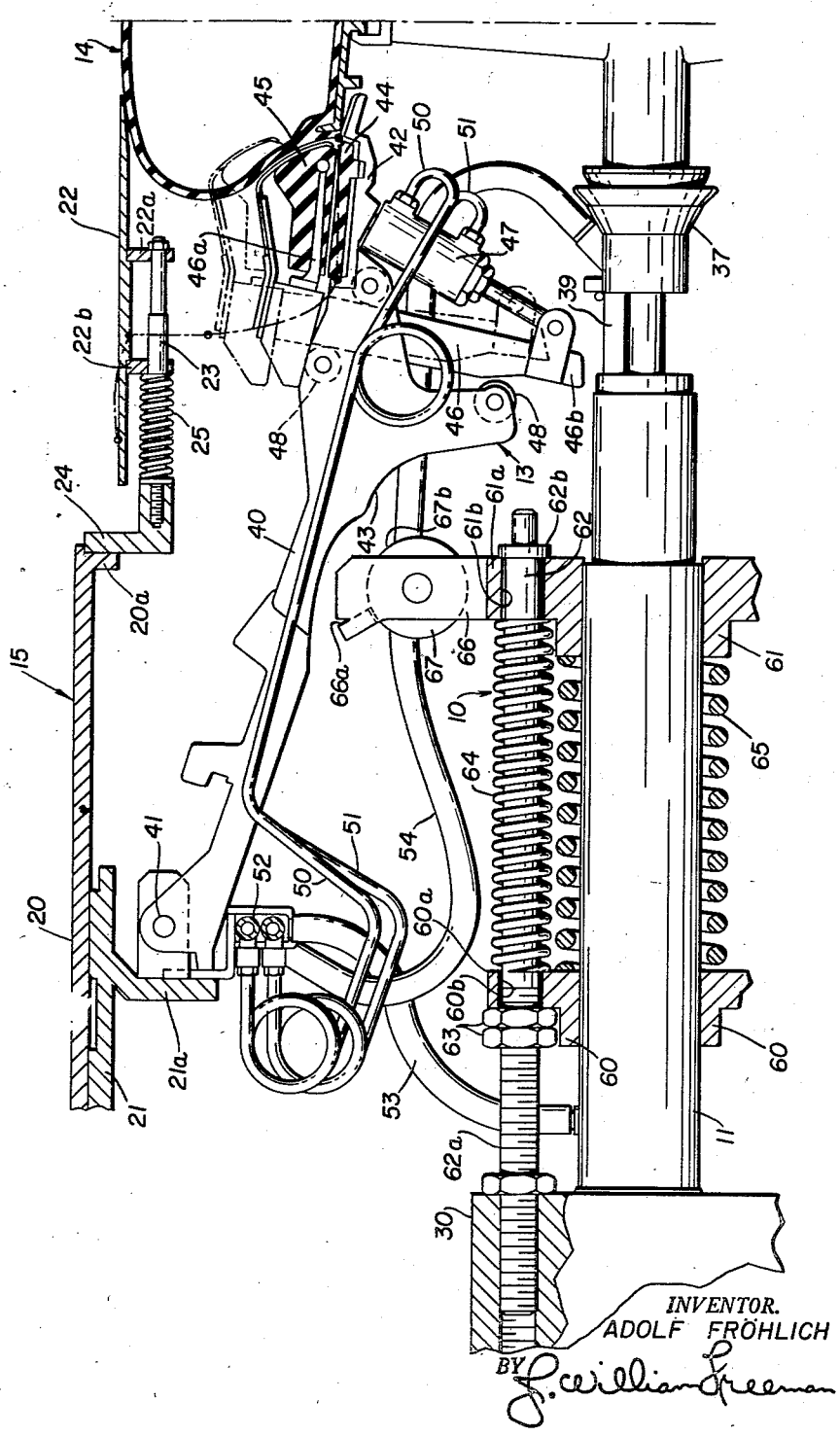

United States Patent Office 2,953,186
Patented Sept. 20, 1960

2,953,186

PNEUMATIC TIRE BUILDING APPARATUS

Adolf Frohlich, Hanover, Germany, assignor to The Cleveland Trust Company, Cleveland, Ohio, as trustee Filed May 2, 1955, Ser. No. 505,447

3 Claims. (Cl. 154—10)

This invention relates to pneumatic tires, and in particular relates to improved methods and apparatus for building pneumatic tires.

For several years past, pneumatic tires have been constructed by building up a plurality of fabric plies on a cylindrical building drum to produce, in known manner, what is conventionally referred to as a "flat-built" tire of tubular construction. This uncured "flat-built" green tire was then deformed to the customary toroidal shape by the use of an air bag positioned interiorly thereof, and this uncured toroidal form was then vulcanized to produce the finished tire.

The above known prior art has been found disadvantageous in several respects; the first and foremost of which relates to the abnormal stress placed on the individual cord members of the fabric plies during the period that the "flat-built" green tire is deformed to its toroidal shape. In this regard, it is manifest that the toroidal shaped tire has a greater radial girth than the width of the fabric ply, with the result that the cords are longitudinally extended to compensate for this increased girth. From the foregoing, it is necessary that the cords employed in the fabric plies be of the type that are longitudinally extensible.

This prerequisite has substantially limited the use of certain longitudinally non-extensible cord materials such as nylon and wire, due to the fact that this type of cord, being longitudinally non-extensible, is dislodged from the surrounding green rubber of the fabric ply during the period of deformation by the air bag, with the result that use of such cords is precluded.

A further disadvantage of the known prior art relates to the creation of wrinkles in the sidewall area of the fabric ply during the aforementioned period of deformation. These wrinkles occur adjacent the bead area of the tire as a result of the diameter being less at this point than the diameter of the tread area. The obvious effect of such wrinkles from a structural standpoint is that the same cause the individual cords to be loosely folded in this area, with the result that the effectiveness thereof is impaired in this area. Additionally, these wrinkles must be smoothed out for appearance purposes, with a stitching tool, the use of which sometimes results in premature, inadvertent damage to the cord members.

From the foregoing, it appears manifest that the known prior art methods of pneumatic tire construction result in the creation of non-uniform stress in the individual fabric cords of the pneumatic tire. These stresses, in the form of longitudinal tension, are extremely severe in certain areas, while being nonexistent in other areas. The overall result of such abnormality is a pneumatic tire having a plurality of cord members incapable of functioning in the most efficient manner.

In U.S. Patent 2,503,815, certain improved tire building apparatus was set forth that was intended to obviate the above difficulties. In essence, this apparatus taught the use of a retracting curvilinear movement to apply fabric plies about a centrally positioned annular building core. The purpose of the retracting curvilinear movement in this apparatus was to create uniform tension in the cord members by making the retracting curve approximate the girth of the core. In this manner, the fabric applied to the core was always under some degree of tension, with the result that tires produced by this apparatus were characterized by the presence of cord members that were under varying degrees of longitudinal tension.

In essence, the apparatus employed in the achievement of such new and improved results as above outlined, depends upon the combined radial and axial movement of two opposed circular courses of gripping elements through a fabric application cycle. This application cycle is defined by a curvilinear path of movement that features combined axial and radial movement of the individual gripping elements about the axis of the building core. In this manner, a fabric ply, positioned about a split building drum, can have the spaced edge portions thereof gripped by the respective circular courses of gripping elements so as to suspend the fabric ply about the axis of the building core upon separation of the split building drums about the common axis of the building core. When such separation has been effectuated, the gripping elements may be moved through their curvilinear path of combined axial and radial movement so as to retractingly apply the fabric ply about the building core.

One embodiment of such apparatus is illustrated in detail in my co-pending application Serial No. 465,385, filed October 28, 1954. The improved form of the invention herein disclosed is similar in many respects to the above referred to co-pending application with the exception of the construction and actuation of the retractible gripping means per se, and accordingly, reference is directed to the drawings and disclosure of the above referred to co-pending application.

Accordingly, it is the principal object of this invention to provide a tire building machine wherein fabric plies are applied over a central building core in retracting curvilinear movement, and characterized by the presence of improved means for effectuating such retracting curvilinear movement.

This and other objects of the invention will become more apparent upon a reading of the following brief specification, considered and interpreted in the light of the accompanying drawings.

Of the drawings:

Figures 2, 3 and 4 are similar views, illustrating the position of certain component parts in various stages during the fabric application cycle.

Figure 5 is a similar view of the component parts in the closed position of the machine.

Figure 1:
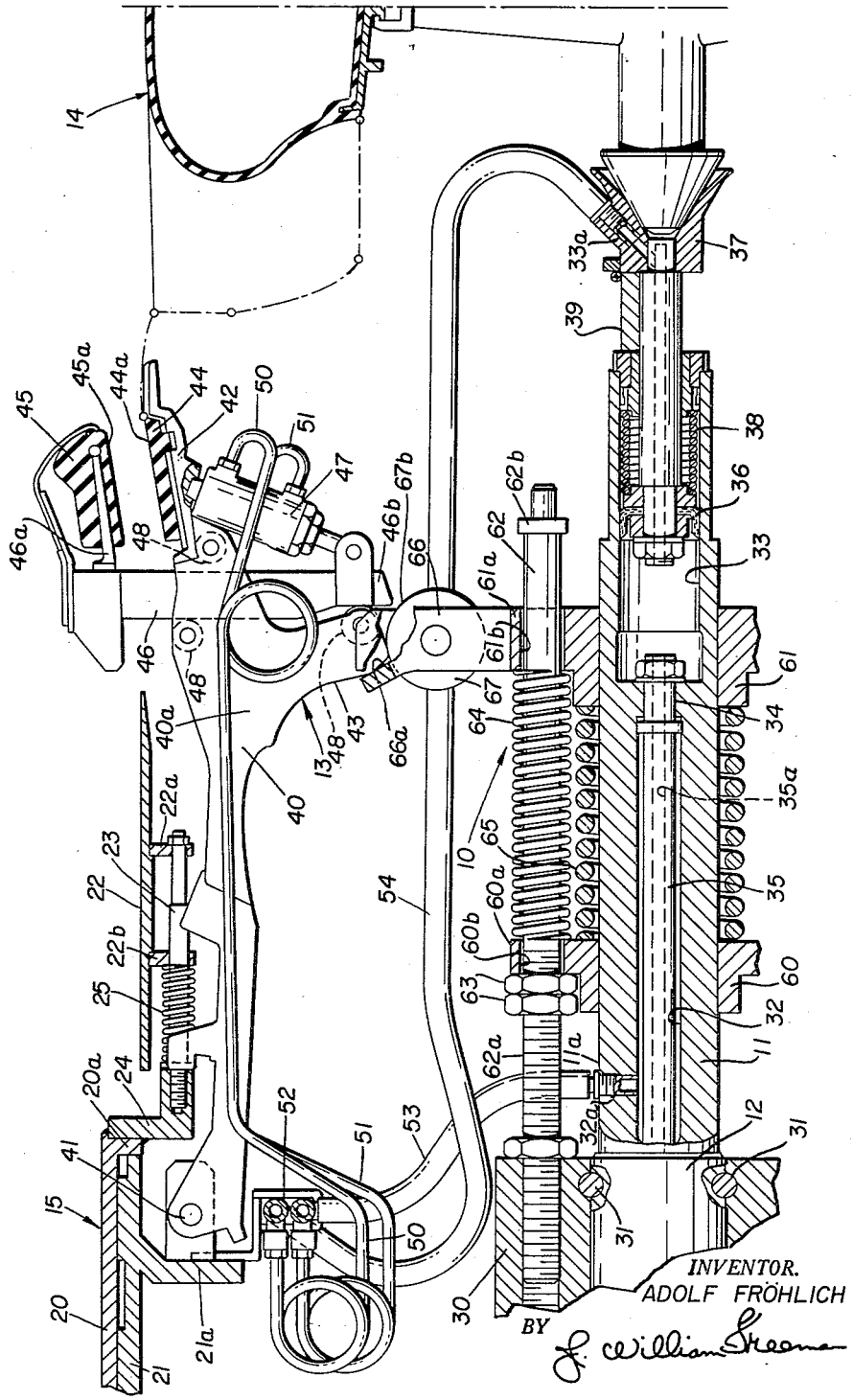
Figure 1 is an elevational view, partly broken away and in section, and illustrating the position of one gripping element in the open position of the improved machine.

Referring now to the drawings, the improved retraction control means, generally designated as 10, are mounted on a shaft extension 11 of a main spindle 12 so as to control the combined radial and axial curvilinear path of movement of gripping means 13, 13 about the axis of a building core 14 upon movement of the building drum 15, axially of the main spindle 12.

The exact nature of the manner in which the drum 15 is mounted on spindle 12 does not effect the operation of the improved retraction control means 10 as long as the drum 15 can be rotated with the spindle while additionally being capable of being shifted axially thereof. Accordingly, any type mounting meeting the dual requirement will operate satisfactorily. As an example of such mounting, reference is made to co-pending application Serial No. 465,385, filed October 28, 1954, where the manner and operation of such a mounting is fully described.

The building drum 15 is shown in the drawings as including an outer cylindrical shell 20, an inner cylindrical shell 21 and a ply-receiving shell 22, the arrangement being such that both the shells 21 and 22 are movable axially of the shell 20 for purposes to be described. To this end, the shell 21 is shown fitted interiorly of the shell 20 and is urged against flange 20a by springs (not shown), so as to normally have the depending flange 21a thereof positioned as shown in Figure 1. By like token, the shell 22 is shown mounted through rings 22a and 22b around a shaft 23 that is in turn threaded into a carrying ring 24 so that spring 25 will urge the shell 22 to the right of Figure 1 under normal conditions. This entire subassembly defining the shell 22 is secured with respect to the shell 20 as a result of ring 24 being welded or otherwise secured, to flange 20a.

With reference now to the construction of the spindle 12, the same is shown as being defined by the previously mentioned axial extension 11, as well as the drive sleeve 30 that surrounds the spindle 12, and is keyed thereto by pins 31, 31 so as to permit the drum 15 to be rotated upon rotation of the spindle 12.

For the dual purpose of supporting the core 14 and actuating the gripping means 13, 13 in a manner to be described, the extension 11 includes axial cavities 32, 33 that are interconnected by aperture 34. Additionally, a hollow pipe 35 extends axially of cavity 32 to have the central passageway 35a thereof communicate with the aperture 34, and in this manner, the cavity 33 is supplied with fluid pressure from a source not shown. Fluid pressure introduced into the cavity 32 may be emitted therefrom to the external surface 11a through aperture 32a. Pressurized fluid received interiorly of cavity 33 as just described operates against piston 36 to move the bell flange unit 37 to the axially extended position of Figure 1, with spring 38 urging the return to an unextended condition when no pressure is present in cavity 33. Egress of pressurized fluid from cavity 33 is through port 33a, it being apparent that a swingable block 39 can be interposed as shown in dotted lines (see Figure 1) to retain the flange unit 37 in the extended position of Figure 1, even though there is no pressure in cavity 33.

Turning now to a description of the gripping means 13, 13 per se, it will be seen that the same are, in essence, defined by a plurality of elongated curving arms 40, 40, each of which is identical in configuration to the form illustrated in Figures 1–5 of the drawings. Accordingly, each curving arm 40 is pivotally hinged to the flange ring 21a as at 41 so that the pivotal movement of the free end 40a thereof may be controlled as a result of contact with the retracting control means 10 in a manner to be described.

To facilitate such controlled movement of each curving arm 40, the free end 40a thereof is bifurcated to define a clamping head 42 and a cam follower surface 43, the arrangement being such that an endless resilient band 44 surrounds the circularly arranged clamping heads 42, 42 to define the clamping surfaces 44a, 44a. This band 44 operates to "pull" the follower surfaces 43, 43 into contact with the control means 10.

Complete gripping action is obtained by the use of a shiftable handle 46 having a plurality of projecting fingers 46a, 46a upon which is mounted a resilient band 45 that includes clamping surfaces 45a, 45a. Additionally, this handle 46 is shown received through an appropriate aperture in the curving arm 40 so as to be vertically shiftable therewith. To the end of effectuating such shifting, a piston 47 is shown interconnecting handle end 46b with clamping head 42 so that contraction of piston 47 will separate surfaces 44a and 45a while expansion thereof will move the same into the closed clamping position of Figures 2, 3 and 4; with rollers 48, 48 guiding such relative movement of handle 46.

Control of the above indicated clamping action has been indicated as being effectuated by piston 47, and to the end of effectuating such control the same (piston 47) is actuated by fluid lines 50, 51 that respectively connect at valve 52, with supply lines 53, 54 leading respectively to cavities 32 and 33 through ports 32a, 33a. The lines 50, 51, 53 and 54 are shown as possessing a certain degree of resiliency so as to permit flexing thereof during the fabric applying operation.

Turning now to the construction of the retraction control means 10 per se, it will be seen that the same includes a pair of slide rings 60 and 61 having the respective radial flanges 60a, 61a thereof provided with apertures 60b, 61b that are aligned with and are received over a circular course of appropriately spaced spindles 62, 62. These spindles 62, 62 are in turn threaded into drive sleeve 30.

In addition to threads 62a, 62a, each spindle 62 includes a shoulder stop 62b that operates to limit the axial movement of the ring 61. Similar restriction of the axial movement of ring 60 is facilitated by nut 63, 63 that are threaded onto portion 62a of spindle 62 so as to adjust the tensioning in spring members 64, 65 that respectively surround spindle 62 and extension 11 so as to urge rings 60 and 61 apart.

In addition to the aforementioned component parts, the ring 61 of means 10 further includes a radial support extension 66 that rotatably supports a cam roller 67 in such a manner that the cam surface 67b thereof controls the radial movement of the curving arm 40 through contact with the cam follower surface 43 thereof. By like token, the axial extent of movement between cam surface 43 and roller 67 is shown limited by integral lug extension 66a that is fixed with respect to the relatively rotatable cam roller 67. This surface 66a provides the requisite interference to move the curving arm 40 towards core 14 during certain periods of relative movement as will presently be described.

*Operation of control means*

In use or operation of the improved retraction control means 10, it will be first assumed that the machine is in the open position of Figure 1, with the ply-receiving shells 22, 22 separated as a result of the drums 15, 15 having been moved axially apart. It will be further assumed that the units 37, 37 have been axially extended so as to support the core 14 between the spaced drums 15, 15.

In this condition the curving arm 40 will be retained in the substantially horizontal position of Figure 1, against the radial contracting force offered by bands 44 and 45, as a result of the contact of surface 43 thereof with the control means 10. This contact will operate to axially retract the ring 61 to the position of Figure 1 in spite of the opposing force afforded by springs 64, 65, and accordingly, the ring 61 may be considered as being held or suspended in this retracted condition until closing movement of drums 15, 15 occurs upon closing of the machine. Additionally, the bands 44 and 45 are shown separated as a result of the piston 47 being contracted by air supplied from cavity 33 through lines 51 and 54.

Figure 2:
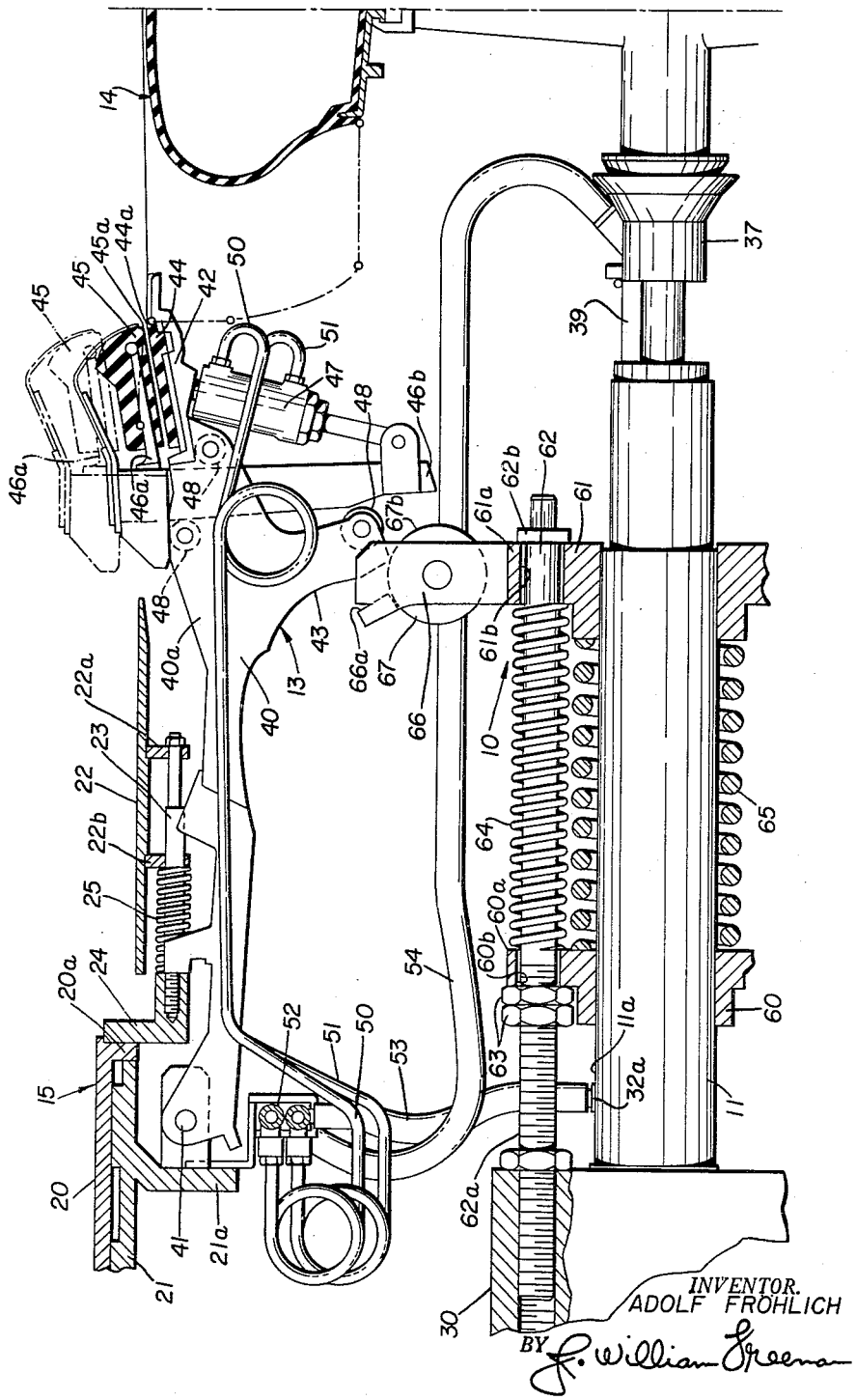
Figure 3:
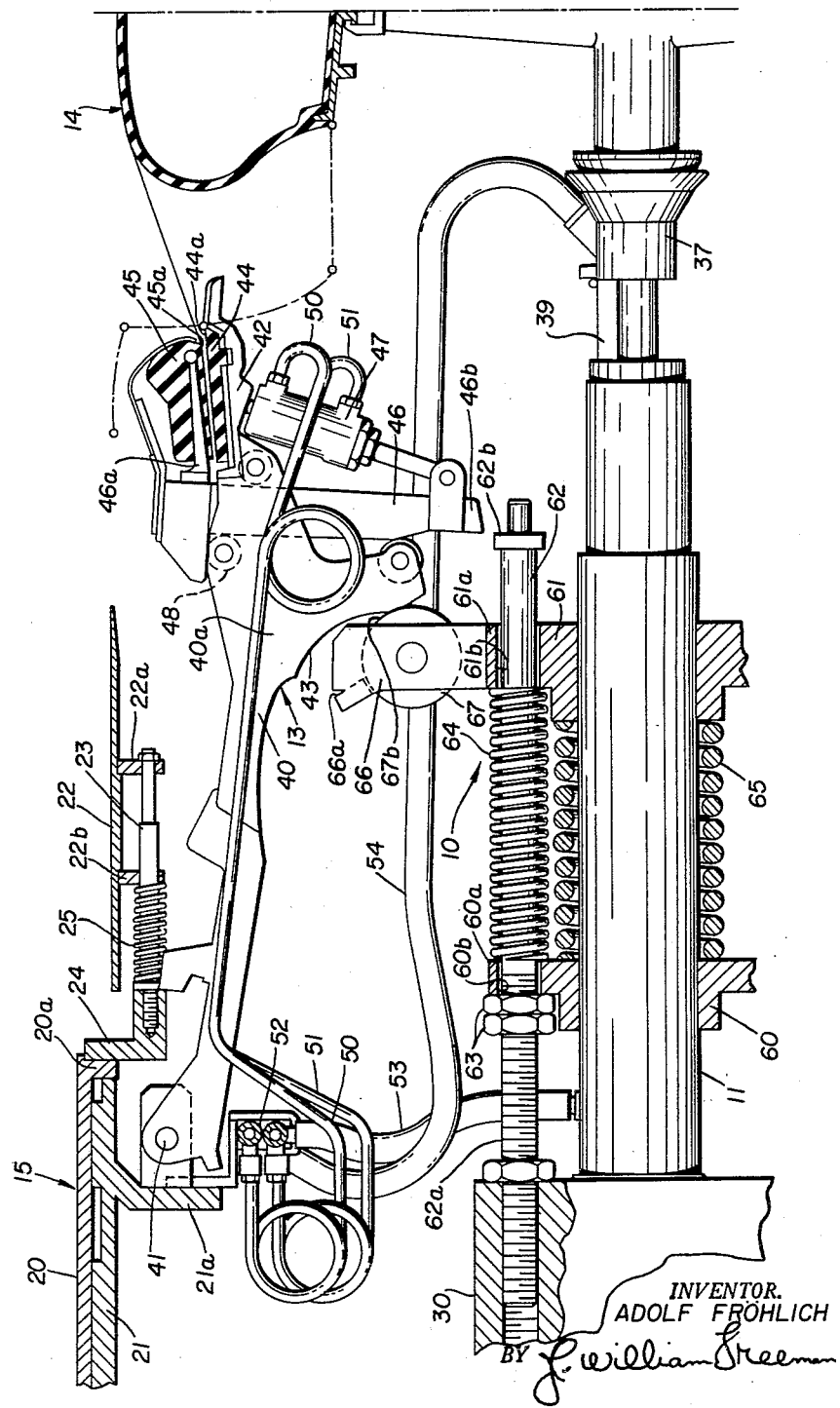

With the above component parts positioned as just described, the drums 15, 15 may be moved axially inwardly so as to approach each other, and during the initial movement of the drum 15 from the position of Figure 1 towards the position of Figure 2, the surface 66a will remain in contact with the cam follower surface 43 and the curving arm 40, in view of the force afforded by the compressed springs 64 and 65. However, as the ring 61 reaches the limit of its axial movement, as defined by the shoulder stop 62b, it will be noted that further movement of the ring 61 will be prohibited, and accordingly, the surface 43 will move along the surface 67b of cam 66 to substantially the position of Figure 2, it being apparent that the contracting force offered by the band 44 will operate to radially "pull" the curving arm 40 downwardly to the position shown in Figure 2 of the drawings.

When the position of Figure 2 has been reached, the fabric ply (not shown) may have the edge portions thereof placed upon the surfaces 44a, 44a of the curving arm 40. At such time as the fabric ply is thus positioned, the piston 47 may be extended to result in the handle 46 moving to the full line position of Figure 2, at which time the fabric ply will be clamped between the clamping surfaces 44a and 45a for subsequent application about the core 14, in a manner to be described.

As further closing movement of the drums 15, 15 continues after such clamping, it will be noted that the surface 43 will move further down on the cam surface 67b, with the result that the free end 40a of the curving arm 40 will be constantly moving radially inwardly with respect to the axis of the core 14 as a result of the contracting force offered by the bands 44 and 45. It is further apparent that as this radially inwardly inward movement of the contoured surface continues the cam surface 67b will be contacted so as to urge the ring 61b axially away from the shoulder stops 62b, with the result that the same will be, in the position of Figure 3, held in a condition wherein an expanding force is being constantly exerted by the springs 64 and 65.

Further closing movement of the drums 15, 15 to the position of Figure 4 will result in the cam surface 67b approaching the end of its contact period with the contoured following surface 43 of the curving arm 40; and accordingly, the ring 61 will be similarly approaching the end of its retracted condition on the spindle 62 as shown in Figure 4.

The termination of such a suspended condition occurs somewhere between the positions of Figure 4 and Figure 5, and accordingly, in Figure 5 of the drawings, the ring 61 is shown abutting the shoulder stop 62b, while the free end 40a of the curving arm 40 has moved radially inwardly to its full extent, the limit of which is determined by the individual widths thereof; this width serving to limit the radial dimension of the circular course that the adjacent free ends 40a, 40a can assume when drawn to their fully contracted position by the band 44.

When the curving arm 40 is in the position of Figure 5, the piston 47 may be contracted from the full line position of Figure 5 to the chain-dotted line position thereof, with the result that the handle 46 will similarly move between the full and chain dotted respective positions of Figure 5 around rollers 48, 48. At this time, the application of the fabric ply is complete and the curving arm 40 may be withdrawn from the position of Figure 5 by merely retracting the drums 15, 15 so as to urge the same apart. As this retracting movement of the drums 15, 15 continues, the cam follower surface 43 will strike the cam surface 67b of cam roller 67, with the result that the curving arm 40 will be raised upwardly against the contracting force afforded by the bands 44 and 45. The limit of such radial expansion of the curving arm 40 is limited by the establishment of contact between the cam follower surface 43 and the lug member 66a; and at such time as this position is reached, the device will be in the position of Figure 1, at which time the operation above described may be repeated for application of another fabric ply.

It will be seen from the foregoing that there has been provided a new and novel method of controlling the radial retraction of circularly arranged gripping means to result in the more efficient application of fabric plies about a central building core.

In the preceding embodiment of the invention, the apparatus employed was described only on one side of the axis of symmetry of the tire machine. It is to be understood that similar apparatus could be positioned on the opposite side of the axis of symmetry to thus effectuate use of equivalent retracting means on both sides of the axis of symmetry of core 14.

Accordingly, other modifications of the invention may be resorted to without departing from the spirit thereof or the scope of the appended claims.

What is claimed is:

1. A pneumatic tire building machine of the character described, comprising; a frame; a spindle having an axis of rotation and being rotatably mounted on said frame; an annular building core having its axis of rotation supported concentrically with respect to the axis of rotation of said spindle; a ply receiving drum rotatably secured in axially shiftable concentric relationship with said spindle; a circular course of elongated arms, each pivoted at one end to said drum and having the opposed free end thereof shiftable radially of the axis of said spindle; gripping elements provided on each said free end of said arms and being disposed between said drum and said spindle; and means for shifting said gripping elements both radially and axially of the common axis of said drum, said spindle and said core; said shifting means including an endless resilient band encircling said gripping elements, whereby a radial contracting force is asserted on the free ends of said arms; a ring member carried on said spindle in axially shiftable relationship therewith; a plurality of cam rollers rotatably carried by said ring at a radial distance from the axis of rotation thereof with said cam rollers being arranged in a circular course around the axis of said ring, with said rollers being spaced radially outwardly of said ring periphery, whereby the respective surfaces thereof may respectively contact the free ends of said elongate arms; and spring means operating axially of said spindle and tensionally contacting said ring member, whereby said cam rollers carried by said ring are maintained in contact with the free ends of said arms during relative axial movement of said drum on said spindle.

2. The device of claim 1 further characterized by the fact that the contracting force of said band exceeds the force of said spring means, whereby the axial position of said ring with respect to said spindle is determined by said band.

3. The device of claim 1 further characterized by the fact that each said free end has a shiftable gripping surface being shiftable relatively of said free end by hydraulic pressure.

References Cited in the file of this patent

UNITED STATES PATENTS

| | | |
|---|---|---|
| 2,313,035 | Breth | Mar. 9, 1943 |
| 2,503,815 | Frohlich | Apr. 11, 1950 |

FOREIGN PATENTS

| | | |
|---|---|---|
| 152,039 | Austria | Dec. 27, 1937 |